United States Patent [19]
Takeuchi

[11] Patent Number: 6,052,668
[45] Date of Patent: Apr. 18, 2000

[54] DATA STORAGE STRUCTURE ON A COMPUTER AND A COMPUTER USING THIS STRUCTURE

[75] Inventor: Hirobumi Takeuchi, Osaka, Japan

[73] Assignee: G & G Pharma Co., Ltd., Osaka, Japan

[21] Appl. No.: 08/859,386

[22] Filed: May 20, 1997

[30] Foreign Application Priority Data

Dec. 18, 1996 [JP] Japan .................................. 8-354069

[51] Int. Cl.<sup>7</sup> ............................. G06F 17/40; G06F 17/60
[52] U.S. Cl. ................................ 705/16; 705/24; 707/100
[58] Field of Search ............................. 707/100, 2, 104; 705/16–25; 235/2–5, 379–381

[56] References Cited

U.S. PATENT DOCUMENTS 5,490,060   2/1996   Malec et al. .............................. 705/10

*Primary Examiner*—Paul V. Kulik
*Attorney, Agent, or Firm*—Evenson, McKeown, Edwards & Lenahan, PLLC

[57] ABSTRACT

Disclosed is a structure of storing data inputted to a computer, wherein the inputted data are recorded on a memory unit in input time order such that the data is in between a pair of predetermined delimit symbols. This provides a novel data storage structure that can store all data occurred by the POS terminal.

9 Claims, 8 Drawing Sheets

```
BEGIN  SALES    19960816  183625

BEGIN       1    ┌─16
     ┌──────────┐
     │ ?        │
     └──────────┘
     END         1

BEGIN ENQUETE  1960924   182418
   17      ENQUETE NO. 10                      ┌19   20
   18──BEGIN │DISPLAYING OF ENQUETE│            (
   ┌─────────────────────────────────────────────────────────┐
   │   ◆  TOILET CLEANING SPRAY 2ND  ◆                       │
   │  ANQUETE REFERRING TO THE GOOD                          │
   │            BOUGHT IN THIS TIME  ····                    │
   │  Q1  REASON FOR SELECTING                               │
   │      OF THIS GOOD IN THIS TIME ? DOBLE ANSWERING        │
   │                                      ARE  POSSIBLE···   │
   │       ···· ( IN PUTTING 1 AGAINST PERTINENT TERMS.)     │
   │    1. CF    [ ] 2. LEAFLET   [1] 3. AFTER CHECKED  [ ]  │
   │                                          THE GOOD       │
   │    4. INTRODUCED BY FRIEND[ ] 5. USED FOR LONG TIME [1] │
   │    6. AS PRICE IS MODERATE [ ] 7. AND THE OTHERS   [ ]  │
   └─────────────────────────────────────────────────────────┘
   18a──END │DISPLAYING OF ENQUETE│──19a
      21──BEGIN│QUESTION NO.1│ 19960924  182419
         23────┌ANSWERED TO 12 ┐──22
               │ANSWERED TO 25 │
      21a─END│QUESTION NO.1│  19960924  182447
                          └23a
        END ENQUETE        19960924  182603
  BEGIN  SALES    19960816   183625
```

FIG. 1

```
20  [BEGIN] SALES 19960924 100345
     ↑1      ↑2
21    KEY REGISTRATION
22      PERSON IN CHARGE  1

↑3                              4
23  [BEGIN]  1                          ↓
24  ┌─────────────────────────────────────────────────────────┐
    │ PLU  4987240210245010120004400 35RYUKAKUSAN    43G110003 │
    │      000000011200000000000000000000000000000011995110900 0000 │
    │      001112402              SCAN                       │
25  │ QUANTITY  1                                            │
26  │ UNIT  PRICE  1120                                      │
27  │ AMOUNT 1120                                            │
    └─────────────────────────────────────────────────────────┘
28  [END]  1
         ↖3a
      ↑5                                 6
29  [BEGIN]  2                           ↓
30  ┌─────────────────────────────────────────────────────────┐
    │ PLU  4959244041019040410005511 39AI.CUPNO.5  72SHEETS240000│
    │      30000000009800000000000000000000000000000019960123 00000 │
    │      0001241206             SCAN                       │
31  │ QUANTITY  3                                            │
32  │ UNIT  PRICE  98                                        │
33  │ AMOUNT 294                                             │
    └─────────────────────────────────────────────────────────┘
34  [END]  2
       ↖5a
35   ┌──────────────────────────┐
     │ TOTAL  1414              │
36   │ CONSUMPTION TAX  42      │
37   │ TOTAL WITH TAX  1456     │
38   │ TAX  1456                │
39   │ DEPOSIT  2000            │
40   │ CHANGE  544              │
41   │ NO. OF RECEIPT  052763   │
     └──────────────────────────┘
42  [END] SALES   19960924  100437
      ↖1a           ↖8
```

FIG. 2

BEGIN SALES    19960816 183625
    BEGIN   1
    ⁀
    END     1

BEGIN   2
    ⁀
    END     2

[INTERRUPTING] ~11

BEGIN SALES    19960816 183646
        BEGIN ~12   1
        ⁀
        END ~12a    1
        BEGIN ~13   2
        ⁀
        END ~13a    2

END SALES      19960816 183650

[END OF INTERRUPTION] ~11a

BEGIN ~14    3
⁀  ~14a
END          3

BEGIN SALES    19960816 183625
    ⌞15a

FIG. 3

BEGIN SALES   19960816  183625
   BEGIN      1    ─16
   [ ? ]
   END        1
      BEGIN ENQUETE  1960924  182418
   17      ENQUETE NO. 10
   18─ BEGIN [DISPLAYING OF ENQUETE]─19   20
   ┌─────────────────────────────────────────────┐
   │  ◆ TOILET CLEANING SPRAY 2ND ◆              │
   │  ANQUETE REFERRING TO THE GOOD              │
   │        BOUGHT IN THIS TIME ····             │
   │  Q 1  REASON FOR SELECTING                  │
   │     OF THIS GOOD IN THIS TIME ? DOBLE ANSWERING │
   │                                ARE POSSIBLE··· │
   │       ····(INPUTTING 1 AGAINST PERTINENT TERMS.)│
   │    1. CF    [ ] 2. LEAFLET   [1] 3. AFTER CHECKED [ ] │
   │                                     THE GOOD   │
   │    4. INTRODUCED BY FRIEND[ ] 5. USED FOR LONG TIME [1] │
   │    6. AS PRICE IS MODERATE [ ] 7. AND THE OTHERS [ ] │
   └─────────────────────────────────────────────┘
   18a─ END [DISPLAYING OF ENQUETE] ─19a
   21─ BEGIN [QUESTION NO.1] 19960924  182419
     23    ┌─────────────────┐
           │ ANSWERED TO 12  │─22
           │ ANSWERED TO 25  │
           └─────────────────┘
   21a─ END [QUESTION NO.1]  19960924  182447
                         ─23a
      END ENQUETE            19960924  182603
BEGIN SALES   19960816  183625

FIG. 4

BEGIN SALES  19960622  183001
PERSON IN CHARGE
PLU NOT REGISTERED  4987426111519 SCAN
25 BEGIN 1

> CLASS 01 MEDICINE  0030MEDICINE  219951101000000002 TUCH
> QUANTITY    1
> UNIT PRICE  500
> AMOUNT      500

END 1
25a                                              26

TOTAL  500
CONSUMPTION TAX  15
TOTAL WITH TAX   515
CASH  515
RECEIPT NO. 001842
END SALES  19960622  183014

F I G. 5

BEGIN SALES  19960924  100345
  BEGIN  1
    PLU 4901301024 0221054147 PANTS    L1100003 00000001
       120000000000000000000000000000000011995110900000000011124 02
    SCAN
    QUANTITIES  1
    UNIT COST    1380
    DISCOUNT FOR MEMBER  -150
    DISCOUNT OF COUPON TICKET  -30
    AMOUNT  1280
  END  1                27
TOTAL  1280
CONSUMPTION TAX  38
TOTAL WITH TAX  1318
RECEIPT NO. 052763
END SALES  19960924  100437

FIG. 6

BEGIN SALES 19960924 100345
  BEGIN 1
    PLU 4987240210245010120004 40035RYUKAKUSAN    43G110000300
        000001120000000000000000000000000000000011995110900000000011
    QUANTITIES 1
    UNIT PRICE 1120
    AMOUNT 1120
  END 1
  BEGIN 2
    PLU 4959244041019040410005 51139AL.CUP NO.5    72SHEETS24000030
        000000009800000000000000000000000000000000011996012300000000 1
        241206        SCAN
    QUANTITIES 3
    UNIT PRICE 98
    AMOUNT 294
                                                  31
  END 2
  BEGIN 2
    CORRECTION    30
  END 2
  TOTAL WITH TAX 1153
  CASH 1456
  RECEIPT NO. 052763
  END SALES 19960924 100437

| NAME / ITEM | NAME(1) | NAME(2) | NAME(3) | | NAME (M) |
|---|---|---|---|---|---|
| ITEM (1) | DATA(1-1) | | | | DATA (M-1) |
| ITEM (2) | DATA(1-2) | | | | DATA (M-2) |
| ITEM (3) | DATA(1-3) | | | | DATA (M-3) |
| ITEM (4) | DATA(1-4) | | | | DATA (M-4) |
| | | | | | |
| | | | | | |
| ITEM (N) | DATA(1-N) | | | | DATA (M-N) |

DATA STORAGE STRUCTURE ON A COMPUTER AND A COMPUTER USING THIS STRUCTURE

BACKGROUND OF THE INVENTION

1. Field of the Invention

The present invention relates to a storage structure for data on a computer, that is, a method of recording data on the memory of a computer.

2. Prior Art

Figure 8:
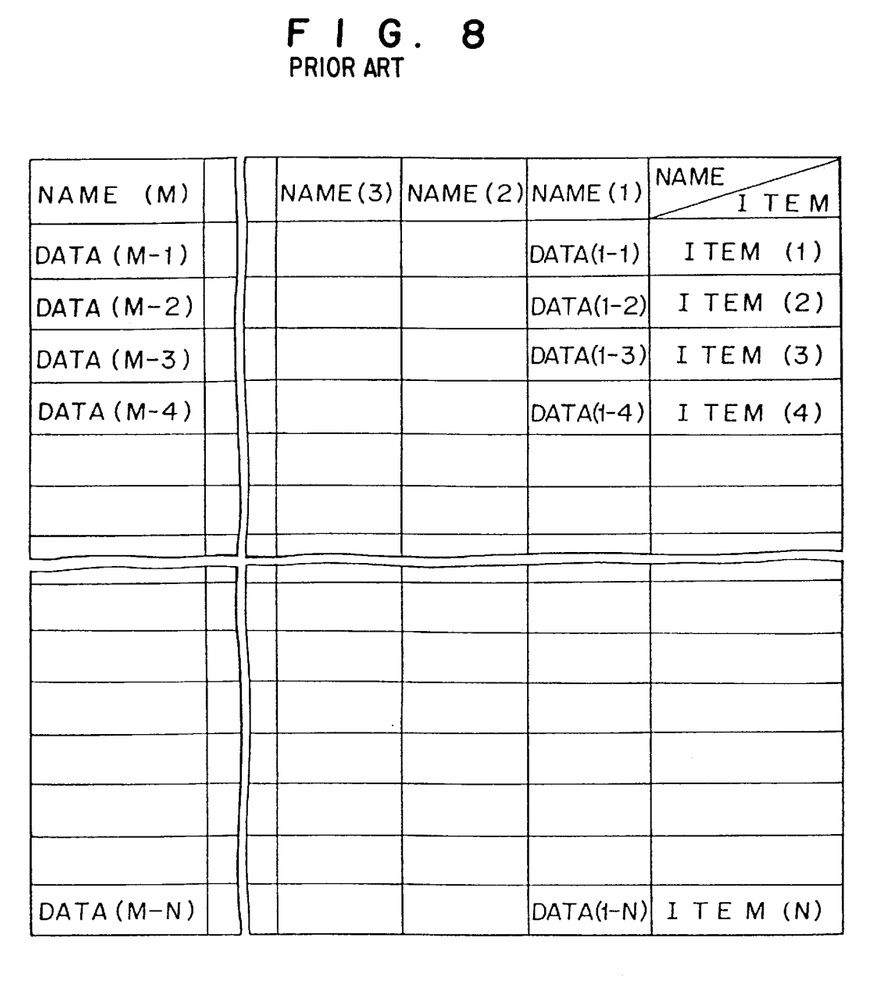
FIG. 8 is a diagram for explaining a data storage structure according to the conventional art.

As a conventional data storage structure, there is known, as shown in FIG. 8, a data structure having records/items which are predeterminedly fixed in a fixed-length binary form.

Such data structures are generally used because of certain restrictions with respect to the hardware, such as the fact that computer hardware resources (disks, memories, etc.) are expensive and hence have to be effectively utilized, as well as with respect to processing efficiency wherein data have to be processed at high speeds. The adverse effects of such known data structures are given below.

1. Data disappearance due to business programs

In the computer many data occur (are input) sequentially. However, where the system has a fixed data structure as described above, data is stored at a predeterminedly fixed data structure. However, at the same time, previously unfixed data is discarded. That is, previously existing data can disappear upon preparing a business program.

Further, the record/item structures are stored by putting a plurality of items into one record. However, there are many instances where no storage is done in order of occurrence or time for each item or the like, which also results in data disappearance 2. Data disappearance due to update of database Where a database is provided to carry out data analysis or various processes, the data occurring have been narrowed down to data which are required for updating the database (transaction data). In this manner, the disappearance of data has also been encountered in updating the database.

Furthermore, there are many cases in which transaction data has been deleted. If such data is left, it is rarely used for data analysis.

This is nothing other than the fact of disappearance of data, despite the fact that progress in OLTP (On-Lines Transaction Processing) has enabled updating of the database with greater reality and stability.

3. Data disappearance in data structure with fixed records/items

In many cases, the length of the record is fixed and the length of the item is also fixed. Accordingly, where unexpected content arises, data disappears or it is omitted. For example, where the commodity name item has a fixed length, such as having eighteen digits, if there occurs a commodity name with greater digits, it may be omitted. Or, where the sales results are fixed at a number of eight digits, there may be a case where the data for the number of the ninth digit exceeding the eighth digit disappears.

4. Limitation of data analysis in fixed data structure

Data disappearing in a manner such as the above 1, 2, 3 or 4 situations is naturally impossible to analyze. If the data is to be stored, it is necessary to redesign the predeterminedly fixed data structure together with the amendment/development of programs related thereto.

Also, although data analysis is done from various points of view, the predeterminedly fixed data structure is constructed by assuming the viewpoint of analysis. To this end, if analysis is to be made from an unexpected viewpoint, the data required for such analysis has to be prepared. If not prepared, the analysis is impossible carry out.

5. Difficulty in system development for data structure of binary form

The binary-formed data structure is impossible to read at one view and can be comprehended only by those people with expertise, thus largely limiting the available personnel for development. Also, to save resources in respect of hardware, efforts are made to shorten the record length and the item length as much as possible so that the system design is made such that reference to the master file or the like is done using many codes and flags. To this end, there arise additional processes between a plurality of files, which further complicates the system and makes development difficult.

6. Difficulty in system development for data structure of record/item

The contents of data cannot be comprehended and dealt therewith, unless there is present a person who knows the design chart (file/layout diagram) or the design chart itself. This limits the available development personnel to those people who know the design of the record/item.

7. Difficulty in system development for fixed data structure

The fixed data structure has a data structure in which results thereof are previously assumed. The entire system is also designed like this. As a result, they have only minimal flexibility for unexpected items or additional processes. In worst cases, a redesign of the entire system is required. For example, only increasing the number by one digit for items, such as commodity codes, of highly frequent use requires the amendment of related systems such as on-screen input, display, printing, etc.

The present invention has been made in view of the above points, and it is the object of the invention to provide a novel data structure which is capable, without disappearance, of storing in operation or process unit form all the data occurring (input) on a computer system in its order of occurrence and with such a flexible structure that it can be comprehended by anyone at a look, thus enabling easy alteration of the system as required.

SUMMARY OF THE INVENTION

In order to solve the above problems, a data storage structure on a computer according to the present invention is characterized by explicitly representing all data which occurs in a variable-length text form in order of its occurrence, thereby providing storage with a structure free from record/item structures.

In the present invention, data is recorded in its order of occurrence so that there exist no fixed data structures, and the data can be stored without requiring an awareness of databases and transactions. Accordingly, it is possible to cope with the addition of new items with much greater flexibility and to drastically raise the capability of program development and production.

In the present invention, data is recorded in an explicit form.

That is, the present invention provides storage with variable length text form. This places the data in a readable state without introducing special editors or viewers. Further, there is no requirement to reference a master file, raising the capability of program development and production.

Also, in the present invention, data is recorded without being restricted by the record/item structure.

Although conventionally data is recorded depending on the record/item structure (two-dimensional configuration), the present invention adopts a free data structure (described below) which is free from restriction by the structure thereof.

1. Storing the data in a set form of meta-data and the data, as a minimum unit.
2. Where there occurs bundling, a set of data by nesting with BEGIN—END is formed for recording.
3. Where not applicable to the above situations 1 or 2, the recording is by natural language (sentence).

According to the present invention, events which have conventionally been difficult to express can now be recorded in a more appropriate and flexible manner.

Also, in the present invention, all the occurring data are recorded without the need for any awareness of the databases and transactions.

The present invention only records possible events in order of occurrence thereof. This makes it possible to keep data which otherwise conventionally disappears due to narrowing down of the data.

PREFERRED EMBODIMENTS OF THE INVENTION

A data storage structure stored in the memory unit (RAM) of a computer according to the present invention will now be explained with reference to the drawings.

Figure 5:
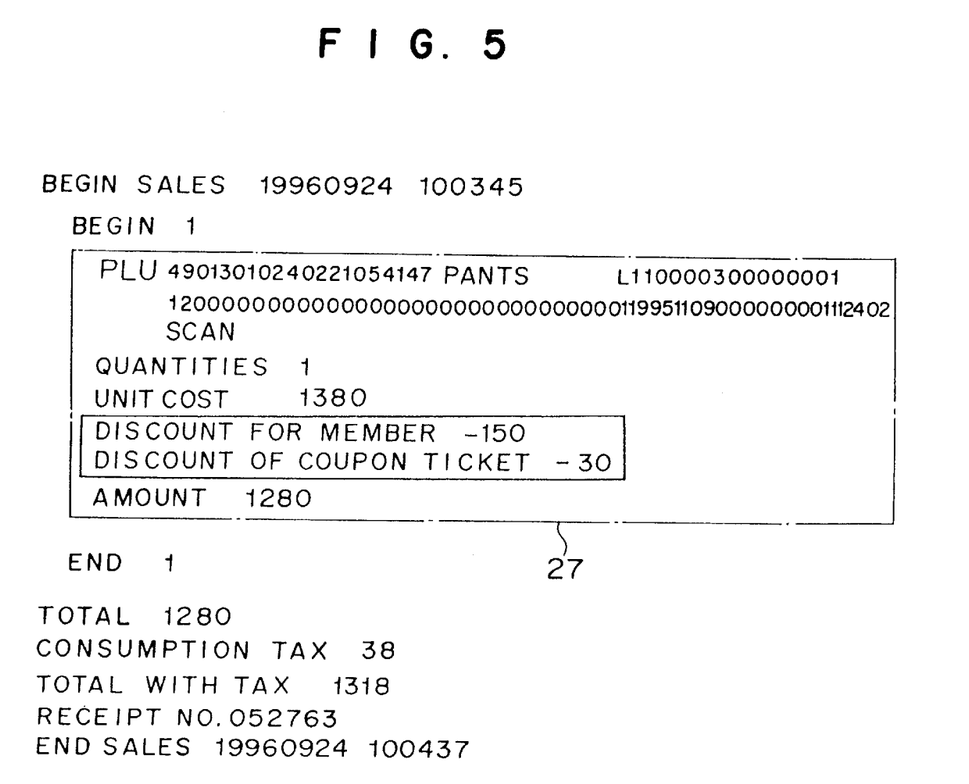
FIG. 5 is a diagram for explaining a data storage structure of the present invention.
Figure 6:
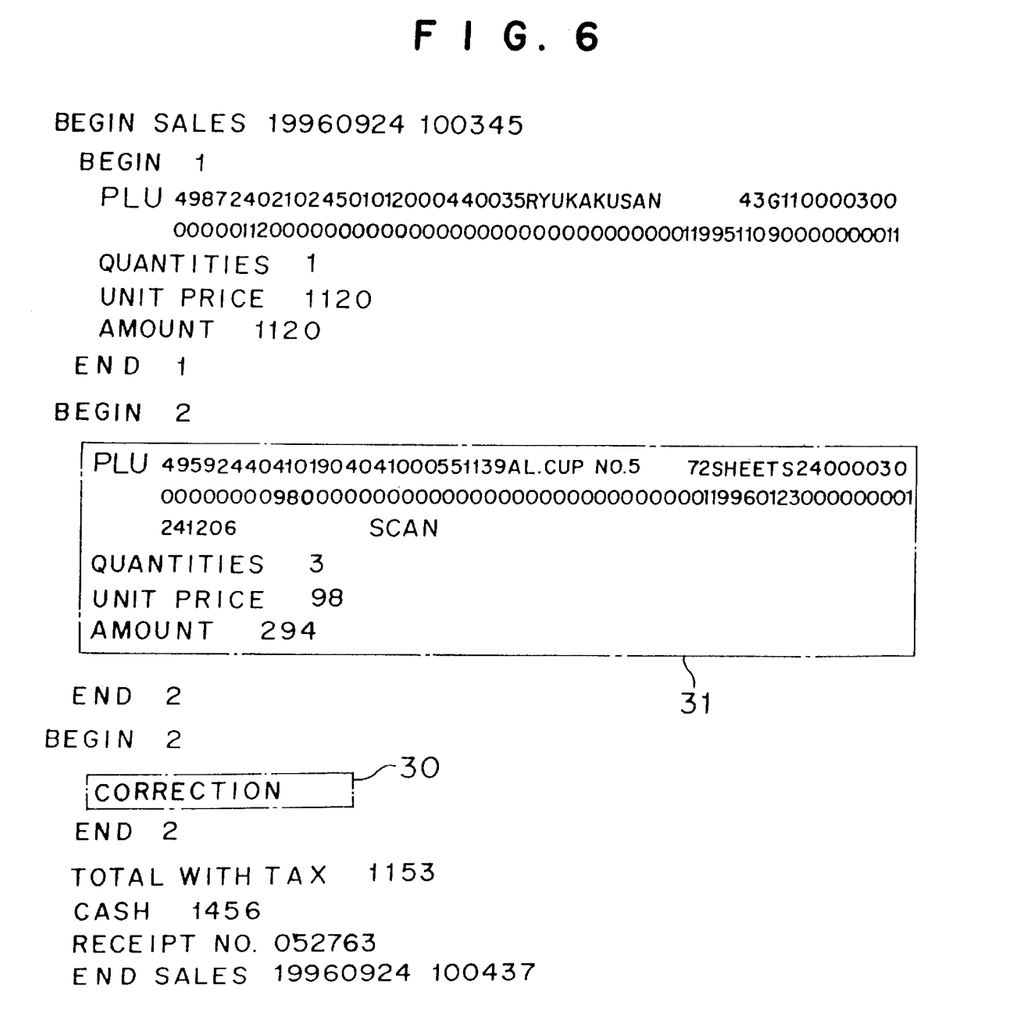
FIG. 6 is a diagram for explaining a data storage structure of the present invention.
Figure 7:
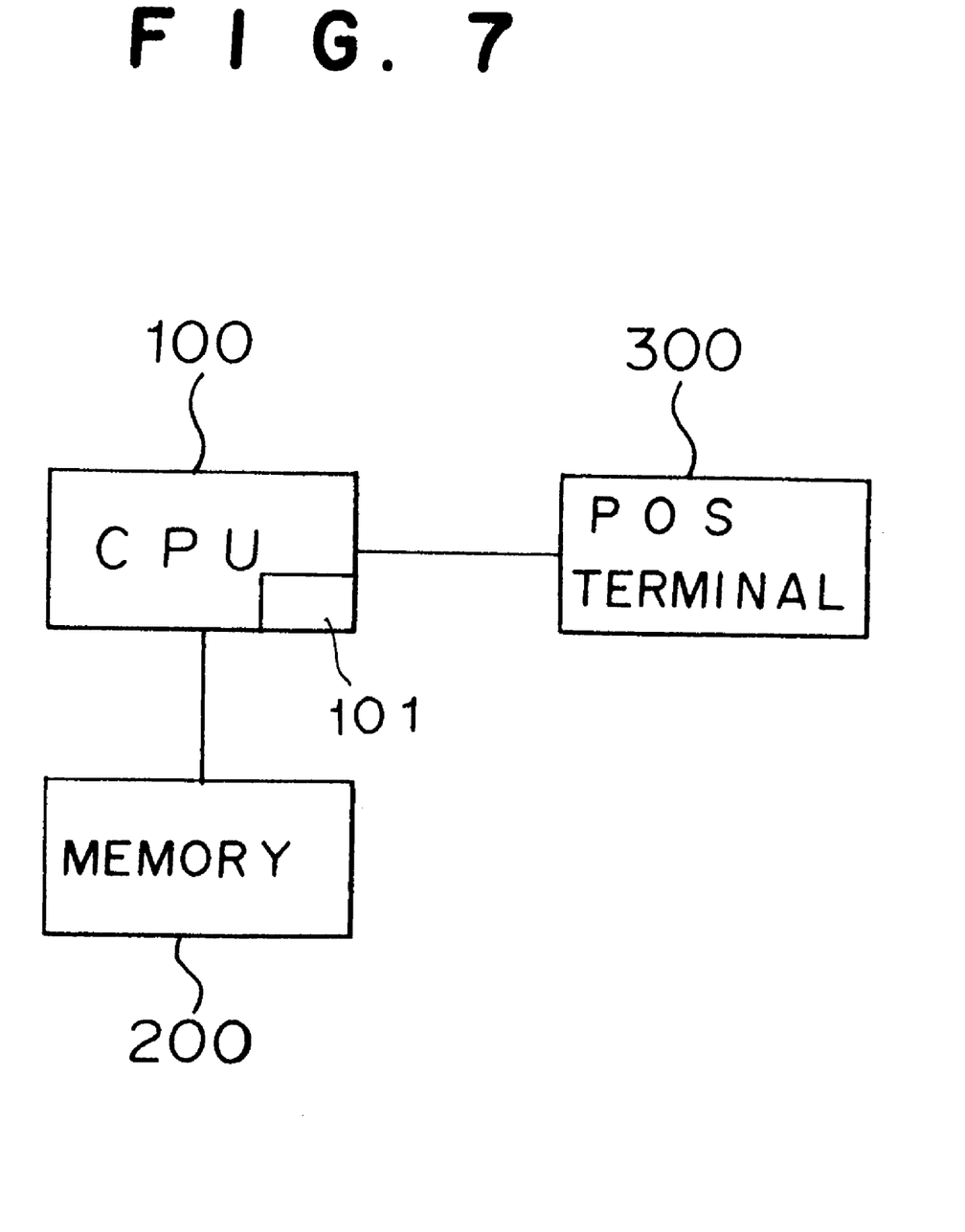
FIG. 7 is a schematic diagram of hardware of the present invention.

FIG. 1 to FIG. 6 show embodiments storing data actually generated in a POS (point of sale) terminal, in the memory unit, and FIG. 7 shows the schematic block diagram according to this invention.

In FIG. 7, 100 is a processing unit of the computer according to the present invention, and the data storing means 101 characterized in the invention is installed in the processing unit 100. Data generated in the POS terminal 300 is stored in the memory unit 200, such as a RAM or a magnetic disc unit, after dealing with the specified process in the data storing means 101.

If data is stored in the memory unit 200, said data is stored between a pair of predetermined delimit symbols, by means of said data storing means 101, and stored in the order in which the data is generated.

The functioning of the data storing means 101 according to the present invention is practically explained below by way of example.

Figure 1:
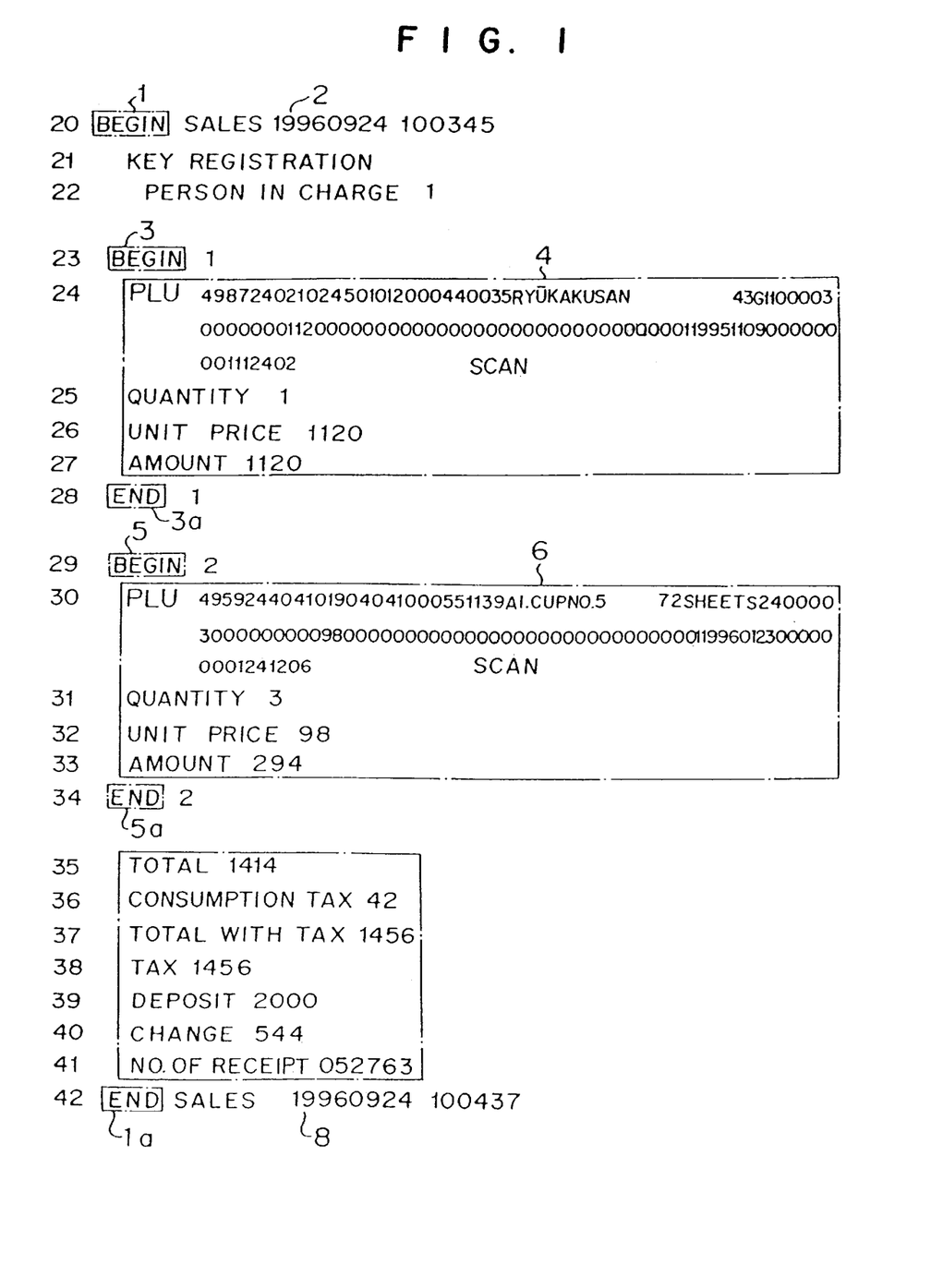
FIG. 1 is a diagram for explaining a data storage structure of the present invention.

FIG. 1 is one example showing a storage structure of data in memory unit 200 input from the POS terminal 300. When an operator 1 inputs sales to the POS terminal 300, if a predetermined operation is made on the POS terminal, BEGIN (delimit symbol) 1 is recorded together with recording data such as the date and hour 2, thereby bringing about a state in which the input data from the POS terminal can be recorded.

Then, the name of the operating person (the operator 1 in line 22) is recorded. Subsequently, if a commodity to be purchased by a customer is scanned by a scanner, PLU (Price Look Up) data and sales data 4 such as quantity, selling unit price, sum of money, etc., are recorded following BEGIN (delimit symbol) 3. Then END (delimit symbol) 3a corresponding to BEGIN 3 is recorded. This ends the sales recording of the first commodity.

Subsequently, if the operator scans a bar code of a next commodity, sales data 6 is recorded following BEGIN (delimit symbol) 5 in the manner stated above, and END 5a corresponding to the BEGIN 5 is recorded to prepare for the next input.

The above example is only for the purchase of the commodity, and accordingly calculation data such as subtotal, tax amount, money of deposit, money of change, and receipt number are recorded, followed by recording END (delimit symbol) 1a corresponding to the first-recorded BEGIN 1. Further, ending date and hour 8 are recorded, and ended.

Figure 2:
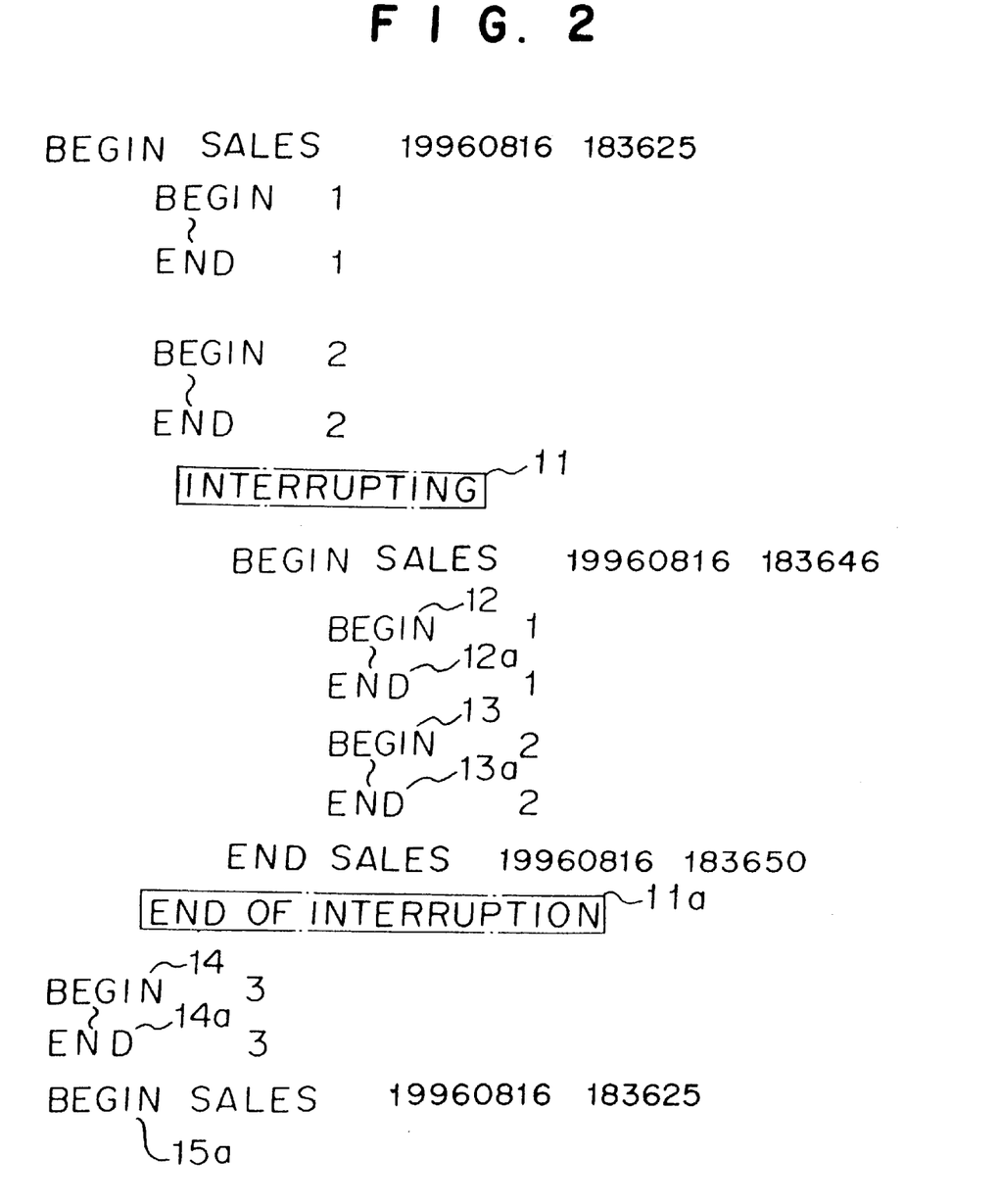
FIG. 2 is a diagram for explaining a data storage structure of the present invention.

In the case of FIG. 2, there is shown a state of data storage in which interruption is made during the process of a sale to one customer, due to a purchasing mistake (such as a missing purchase of a commodity) by another customer.

Specifically, when an "interrupt" key on the POS terminal is operated, interruption 11 is recorded and thereafter the data processed so far retreats (is sent) to the memory. With the state in a nesting operation, the sales data concerning the interruption are recorded in between delimit symbols 11, 11a comprised of BEGIN—END.

In the case of FIG. 2, two pairs of delimit symbols 12, 12a, 13, 13a are recorded to represent the fact that two kinds of commodities are purchased. When the interruption process is completed, "interrupt end" 11a is recorded and, at this time, the data sent and stored to the memory are recalled therefrom.

Then, the treatment of dealing with the first customer is thereafter recorded between the BEGIN=END lines 14, 14a, and the calculation results such as sum of money, receipt number, etc., are recorded. Finally, END 15 and time of completion are recorded to end the process.

In this manner, the data is recorded sandwiched between a pair of delimit symbols comprised of BEGIN—END, and the data is stored by nesting in accordance with the occurrence of the data due to key operations from the POS terminal.

When data is recorded by nesting, the data is wholly recorded between the delimit symbols of BEGIN—END.

Figure 3:
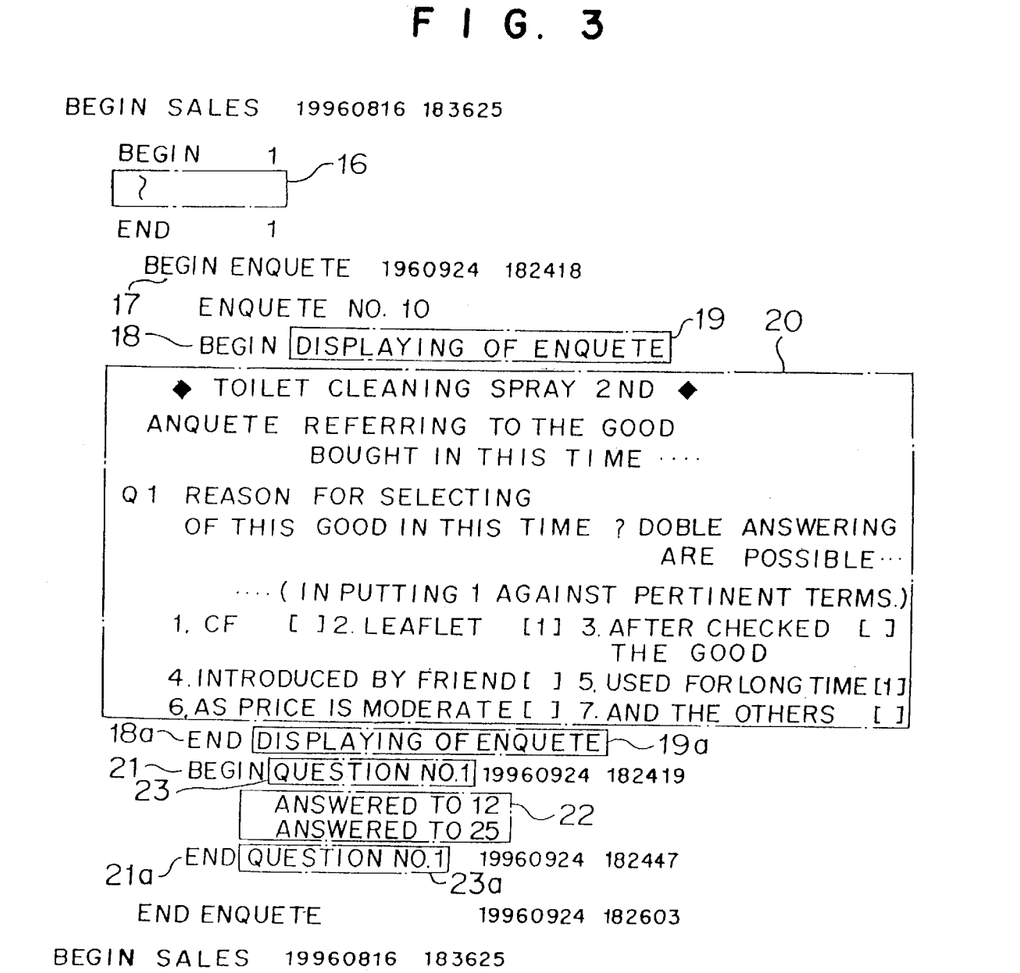
FIG. 3 is a diagram for explaining a data storage structure of the present invention.

FIG. 3 is another example showing a data storage structure of the present invention.

The POS terminal of the present invention is provided with a questionnaire function. FIG. 3 illustrates a state where the contents of questions employed in a questionnaire and the reply data thereto are recorded.

Specifically, if a key on the POS terminal for carrying out the questionnaire is operated, the sales data 16 are at once retreated (stored) to the memory.

When the recording state is placed into a nesting state by this key operation, BEGIN 18 and "questionnaire display" 19, following BEGIN 17 and date and hour data, are recorded, into which the content of questionnaire 20 is recorded. An END 18a is recorded and "questionnaire display" 19a is displayed, ending the display of the questionnaire.

Subsequently, if the reply to the questionnaire by the customer is inputted, the reply data is recorded as data 22 between BEGIN—END 21, 21a, followed by recording the ending time of the questionnaire.

At this time also, "questions" 23, 23a are recorded respectively following BEGIN 21 and END 21a.

Thereafter, the data stored in the memory is retrieved to record the required data such as sum of sales and receipt number, etc., and then the recording of the questionnaire to this customer as well as the recording of sales are ended.

The nesting operation of the recording in this manner makes possible the recording of any data.

As described above, the contents of the questions in the questionnaire as well as the replies to the questions are respectively recorded as "questionnaire display" 19, 19a and "question" 23, 23a following the BEGIN line and the END line, so that the contents of the data recorded between the BEGIN line and the END lines are explicitly represented, thereby rendering data search easy and data analysis extremely easy.

Figure 4:
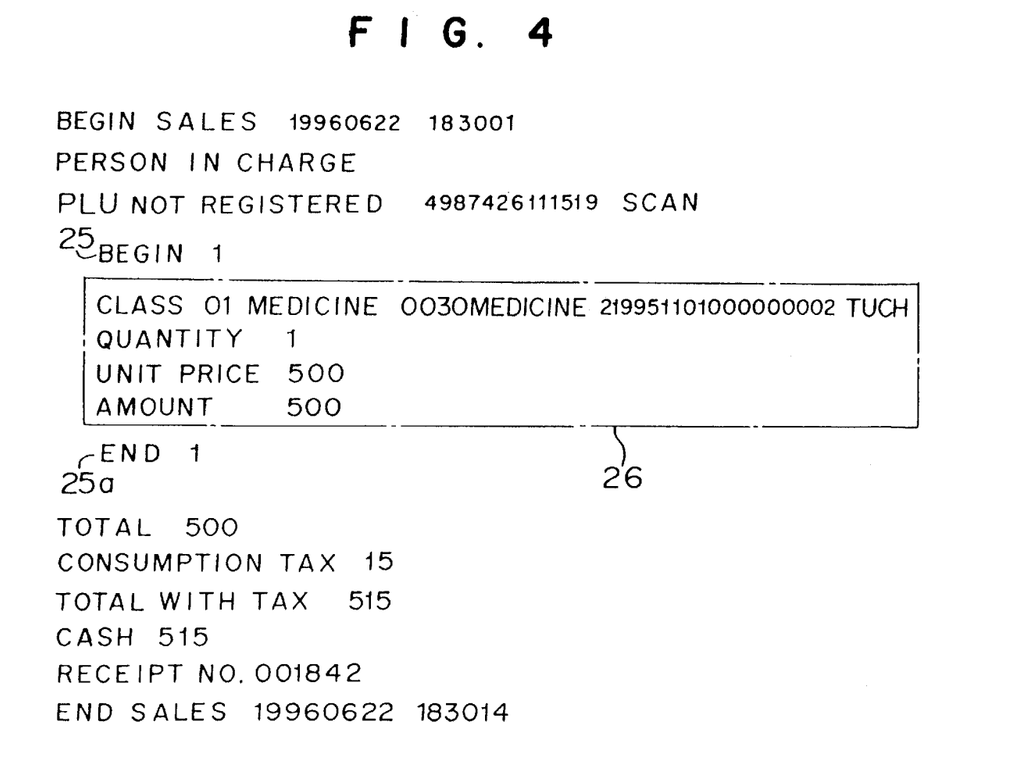
FIG. 4 is a diagram for explaining a data storage structure of the present invention.

FIG. 4 shows a state where sales data is key-inputted from the POS terminal because a commodity scanned by this terminal is not registered.

There it is shown that, because it was not registered in PLU, all the data, i.e. the data 26 such as the commodity name, dealing department, commodity number, quantity, unit price, sum total, etc., are inputted from the POS terminal between BEGIN—END 25, 25a.

FIG. 5 shows a state illustrating discounting. Between BEGIN—END are recorded the sales data 27 as well as the member—s discount and coupon discount 28.

FIG. 6 shows a state that the commodity once scanned, i.e., the commodity sales-processed is given up of purchasing, in which recording is made as correction data 30 for the state that the sales of the commodity sales-processes immediately before is cancelled by operating a correction key of the POS terminal.

Incidentally, in the above embodiments, even though the explanations were given as examples of storing data inputted from the POS terminal, it is clear from the above explanations that the present invention is applicable to such systems that are arranged to store, in order of occurrence, data inputted from an input unit.

In this manner, the data storage structure on a computer of the present invention is characterized by a storage structure of data inputted to a computer wherein the inputted data are recorded on a memory unit in the input time order such that the data is between a pair of predetermined delimit symbols.

Also, it is characterized by providing another pair of delimit symbols between the aforesaid pair of delimit symbols, wherein the data are recorded in a nesting state by registering the recording data in between the same delimit symbols.

Also, it is characterized by data structuring such that the contents of the data recorded in between the delimit symbols are explicitly represented.

Incidentally, naturally the delimit symbols may be something other than BEGIN and END.

Comparing FIG. 1 showing an embodiment of the present invention and FIG. 8 showing a conventional example, it will be clear at first glance that the data structure of the present invention is in a readable state. Furthermore, it will be readily understood that the meta-data such as quantity, selling sum of money, etc. and the data corresponding thereto are stored in a set form.

This makes design charts of data (file/layout charts) unnecessary, greatly eliminating restrictions on the development personnel.

Since the present invention merely records data in order of its occurrence so that the data is outputted by operation unit or process unit only, accordingly, the adverse effect of data disappearance in the case of the fixed data structure is completed covered.

There exists no fixed data structure in the present invention, rendering it free from any needed awareness. Furthermore, the variable length dramatically raises the capability of program development and production. For example, where there is an addition of new items, in the conventional data structure the development is started after seeing the design chart of data (file/layout chart) to confirm the presence of a blank. Where a blank is not present, redesign of the data is required. In worst cases, the development of the entire system is affected, as was already explained. In the present invention, however, the new addition of items only requires outputting the data in its order of occurrence, and there is no binding by fixed length upon system development because of variable length.

Since the present invention is free from disappearance of data, the matter that cannot be analyzed conventionally encountered is overcome, eliminating the requirement of system alteration on all such occasions.

Also, the present invention does not store data by assuming viewpoints of analysis, and accordingly can flexibly cope with the case where analysis is to be done from unexpected points of view.

In this manner, the present invention possesses excellent features in phases of system development and data analysis.

What is claimed is:

1. In a storage structure recorded by a computer system that is controlled with a POS operating program so as to be a POS computer, a method of storing data in the data storage structure on the POS computer comprising the acts as follows:

(1) storing data upon operation by an operator using a POS terminal of the computer system in order of the occurrence thereof and without consideration of record/item configuration structure;

(2) in the case of the data that said operator inputs by scanning a bar-code of a commodity, storing the data by adding to every commodity the necessary sign for merchandise control; and (3) in the case of data occurring by key input, storing the data by adding the sign to capture the data.

2. The method of claim 1, wherein for each said data storage structure on the computer, the method comprises the acts of storing data as follows:

(1) storing sales data of every customer by adding a delimit symbol at the times of starting and finishing the entry of data;

(2) storing the data of every commodity by a nesting operation equipped with a delimit symbol at the times of starting and finishing the entry of data;

(3) storing the data by automatically adding items with a reference to a sum total at the end.

3. The method of claim 2, wherein for each said data storage structure on the POS computer, the method comprises the acts of storing data as follows:

(1) storing letters of a non-registered commodity in a case wherein Price Look Up of the commodity is not registered when the bar-code of the commodity is scanned;

(2) storing the data by inputting the commodity name by the key input of the operator after automatically switching to a key input condition at the POS terminal; and (3) storing the data by inputting the reference data.

4. The method of claim 2, wherein for each said data storage structure on the POS computer, the method comprises the acts of storing data as follows:

(1) storing interrupt letters by pushing an interrupt key when an interruption caused by a purchasing mistake made by another customer occurs while inputting the sales data;

(2) storing the purchasing mistake commodity data while temporarily storing the data so far processed in the memory in an interrupting state, while adding the delimit symbol before and after the interruption;

(3) storing the data first sale's complete data by adding the finishing-time delimit symbol.

5. The method of claim 3, wherein for each said data storage structure on the POS computer, the method comprises the acts of storing data as follows:

(1) storing interrupt letters by pushing an interrupt key when an interruption caused by a purchasing mistake made by another customer occurs while inputting the sales data;

(2) storing the purchasing mistake commodity data while temporarily storing the data so far processed in the memory in an interrupting state, and then storing the data in the nesting operation state, while adding the delimit symbol before and after the interruption;

(3) storing the data by recalling the temporarily stored data and continuing to input the commodity of the first customer; and (4) storing the first sale's complete data by adding the finishing-time delimit symbol.

6. The method of claim 4, wherein for each said data storage structure on the POS computer, the method comprises the acts of storing data as follows;

(1) storing letters of questionnaire items displayed by pushing a questionnaire key when a questionnaire is administered to a customer while inputting sales data;

(2) storing the data by inputting the items chosen by the customer under an input waiting state of the items;

(3) storing the data by inputting the next commodity under the commodity input state; and (4) storing the sales data after the data is finished at the delimit symbol.

7. The method of claim 5, wherein for each said data storage structure on the POS computer, the method comprises the acts of storing data as follows:

(1) storing letters of questionnaire items displayed by pushing a questionnaire key when a questionnaire is administered to a customer while inputting sales data;

(2) storing the data by inputting the items chosen by the customer under an input waiting state of the items;

(3) storing the data by inputting the next commodity under the commodity input state; and (4) storing the sales data after the data is finished at the delimit symbol.

8. A POS computer device provided with a means for storing data between a pair of predetermined delimit symbols, together with all data generated in the POS terminal, into a memory unit in the order in which the data is generated.

9. A method of storing data in a data storage structure in a computer, said data-storage structure being adapted to store all occurring data in the order in which they occur, so as to enable easy alteration of the system as required, the method of storing data comprising the acts as follows:

(1) recording the data in the order of occurrence thereof, so that there exists no fixed data structures and so that it is possible to cope flexibility with additional items;

(2) recording the data in an explicit and variable length text form that is readable without the use of special editors or viewers;

(3) recording the data without restriction by record/item configuration structures, including any two dimensional configurations; and (4) recording all the occurring data that are recorded by nesting with BEGIN-END or by a natural-language sentence without requiring an awareness of databases and transactions.

* * * * *